(12) United States Patent
Naito et al.

(10) Patent No.: US 7,609,505 B2
(45) Date of Patent: Oct. 27, 2009

(54) CHIP SOLID ELECTROLYTE CAPACITOR AND PRODUCTION METHOD OF THE SAME

(75) Inventors: Kazumi Naito, Chiba (JP); Katutoshi Tamura, Chiba (JP)

(73) Assignee: Showa Denko K.K., Tokyo (JP)

( * ) Notice: Subject to any disclaimer, the term of this patent is extended or adjusted under 35 U.S.C. 154(b) by 210 days.

(21) Appl. No.: 10/567,759

(22) PCT Filed: Aug. 12, 2004

(86) PCT No.: PCT/JP2004/011861

§ 371 (c)(1),
(2), (4) Date: Feb. 10, 2006

(87) PCT Pub. No.: WO2005/017929

PCT Pub. Date: Feb. 24, 2005

(65) Prior Publication Data

US 2006/0262488 A1 Nov. 23, 2006

Related U.S. Application Data

(60) Provisional application No. 60/496,664, filed on Aug. 21, 2003.

(30) Foreign Application Priority Data

Aug. 13, 2003 (JP) ............................. 2003-292805

(51) Int. Cl.
*H01G 9/00* (2006.01)

(52) U.S. Cl. ................. 361/523; 361/516; 361/519; 361/525; 361/528; 361/529; 29/25.01; 29/25.03

(58) Field of Classification Search ......... 361/523–541, 361/516–519, 508–512; 29/25.01, 25.03
See application file for complete search history.

(56) References Cited

U.S. PATENT DOCUMENTS

| | | | |
|---|---|---|---|
| 5,198,967 A * | 3/1993 | Kuranuki et al. ............ 361/523 |
| 6,392,869 B2 * | 5/2002 | Shiraishi et al. ............. 361/523 |
| 6,430,026 B1 | 8/2002 | Nagato et al. | |
| 6,449,140 B1 * | 9/2002 | Sakai et al. ................. 361/532 |
| 6,706,078 B2 * | 3/2004 | Nitoh et al. ................ 29/25.03 |
| 6,816,358 B2 * | 11/2004 | Kida et al. .................. 361/540 |
| 6,912,117 B2 * | 6/2005 | Arai et al. .................... 361/523 |
| 7,190,571 B2 * | 3/2007 | Heusmann et al. .......... 361/523 |

FOREIGN PATENT DOCUMENTS

| | | |
|---|---|---|
| EP | 1 324 359 A1 | 7/2003 |
| JP | 60-37114 | 2/1985 |
| JP | 3-6808 A | 1/1991 |

(Continued)

*Primary Examiner*—Nguyen T Ha
(74) *Attorney, Agent, or Firm*—Sughrue Mion, PLLC

(57) ABSTRACT

The present invention relates to a resin-molded chip solid electrolyte capacitor comprising a plurality of solid electrolyte capacitor elements horizontally laid in parallel with no gap on a pair of oppositely disposed end parts of a lead frame, and a fixing layer which is extending across the plurality of capacitor elements and fixing the capacitor elements with each other; and having low equivalent series resistance (ESR) and low leakage current (LC value), a production method of the same and an electronic device using the capacitor.

21 Claims, 2 Drawing Sheets

FOREIGN PATENT DOCUMENTS

| | | |
|---|---|---|
| JP | 5-234829 A | 9/1993 |
| JP | 5-343272 A | 12/1993 |
| JP | 7-66901 B2 | 7/1995 |
| JP | 9-45592 A | 2/1997 |
| JP | 2003-142337 A | 5/2003 |
| WO | WO 00/75943 A1 | 12/2000 |
| WO | 02/15208 A1 | 2/2002 |

* cited by examiner

CHIP SOLID ELECTROLYTE CAPACITOR AND PRODUCTION METHOD OF THE SAME

CROSS REFERENCE TO THE RELATED APPLICATIONS

This is an application filed pursuant to 35 U.S.C. Section 111(a) with claiming the benefit of U.S. Provisional application Ser. No. 60/496,664 filed Aug. 21, 2003 under the provision of 35 U.S.C. Section 111(b), pursuant to 35 U.S.C. Section 119(e)(1).

TECHNICAL FIELD

The present invention relates to a chip solid electrolyte capacitor with low equivalent series resistance (ESR) and good leakage current (LC value) and a production method of the same.

BACKGROUND ART

As an example is shown in the perspective view of FIG. 3, a conventional chip solid electrolyte capacitor is known, which has a structure that one solid electrolyte capacitor element (2) where an oxide dielectric film layer, a semiconductor layer and an electrically conducting layer are formed in this order on a surface of a sintered body comprising a valve-acting metal or an electrically conducting oxide is used, a part of the electrically conducting layer and an anode lead (4a) (anode part) connected to the sintered body are laid on a pair of oppositely disposed end parts (1a and 1b) which are a part of a plate-like metal-made lead frame (1) and each works out to an external terminal, respective parts are electrically or mechanically connected to the end part, the entirety is then molded with resin while leaving outside only the external terminal parts of the lead frame to form a chip jacket part (5), and the lead frame outside the jacket part is cut and bent at predetermined portions.

On the other hand, with recent progress of high-frequency processing of electronic devices, the solid electrolyte capacitor is also demanded to have good high-frequency performance. The present inventors have already proposed in JP-A-5-234829 (the term "JP-A" as used herein means an "unexamined published Japanese patent application") a chip solid electrolyte capacitor having good high-frequency performance values, where a plurality of solid electrolyte capacitor elements each obtained by sequentially stacking an oxide dielectric film layer, a semiconductor layer and an electrically conducting layer to form a cathode part on a surface of an anode substrate comprising a valve-acting metal and having an anode part are used and where the cathode parts are partially laid in parallel with no gap on one end part of a lead frame having a pair of oppositely disposed end parts, the anode parts are laid on the other end part, respective parts are electrically and mechanically connected to the end part, the entirety is molded with resin while leaving outside a part of end parts of the lead frame, and the lead frame outside the resin mold is cut and bent at predetermined portions.

For maintaining the electric charge supplied to the inside of a capacitor, a chip solid electrolyte capacitor is demanded to have an LC value as low as possible.

DISCLOSURE OF THE INVENTION

Figure 1:
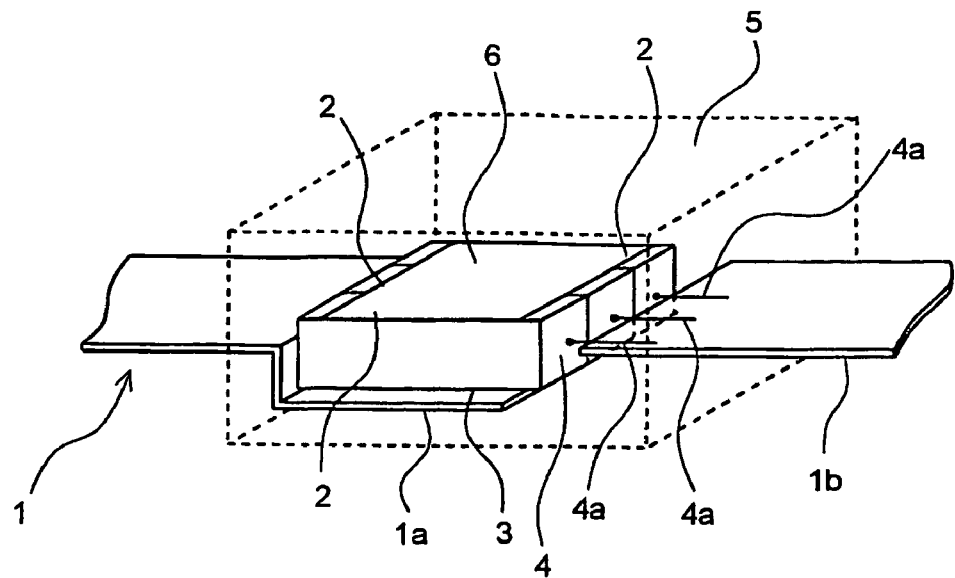
FIG. 1 is a perspective view of a chip solid electrolyte capacitor, showing the state where three solid electrolyte capacitor elements each having an anode lead (anode part) are placed horizontally in parallel with no gap on end parts of a lead frame.

When a large number of chip solid electrolyte capacitors are produced by laying a plurality of the above-described capacitor elements in a row, the average LC value sometimes increases.

As a result of intensive investigations to solve this problem, the present inventors have found that the increase in the average LC value is highly probably ascribable to a stress caused when molding resin acts to separate a plurality of capacitor elements gaplessly laid in parallel on a frame and when on at least a part of the plurality of capacitor elements, a fixing layer which is extending across the capacitor elements and fixing the capacitor elements with each other is stacked and then the capacitor elements are molded, the problem can be solved. The present invention has been accomplished based on this finding.

That is, the present invention relates to a chip solid electrolyte capacitor, a production method of the same and electronic devices using the capacitor as described below.

1. A resin-molded chip solid electrolyte capacitor comprising a plurality of solid electrolyte capacitor elements horizontally laid in parallel with no gap on a pair of oppositely disposed end parts of a lead frame, and a fixing layer which is extending across the plurality of capacitor elements and fixing the capacitor elements with each other.

2. The chip solid electrolyte capacitor as described in 1 above, wherein the solid electrolyte capacitor element is produced by stacking an oxide dielectric film layer, a semiconductor layer and an electrically conducting layer in this order to form a cathode part on a surface exclusive of the anode part at one end of an anode substrate comprising a sintered body of a valve-acting metal or an electrically conducting oxide or comprising the sintered body connected with a metal wire, and the anode part and the cathode part each is laid to come into contact with the end part of the lead frame.

3. The chip solid electrolyte capacitor as described in 1 or 2 above, wherein the fixing layer is a resin layer or an electrically conducting layer.

4. The chip solid electrolyte capacitor as described in 2 or 3 above, wherein the anode part comprises a distal end of the anode substrate.

5. The chip solid electrolyte capacitor as described in any of 2 to 4 above, wherein the anode part comprises a metal wire or foil connected to the sintered body.

6. The chip solid electrolyte capacitor as described in 5 above, wherein the metal wire is selected from tantalum, niobium, aluminum, titanium, alloys mainly comprising such a metal, and these metals and alloys which are partially oxidized and/or nitrided.

7. The chip solid electrolyte capacitor as described in any of 2 to 6 above, wherein the valve-acting metal or electrically conducting oxide is tantalum, aluminum, niobium, titanium, an alloy mainly comprising such a valve-acting metal or niobium oxide, or a mixture of two or more members selected from these valve-acting metals, alloys and electrically conducting oxides.

8. The chip solid electrolyte capacitor as described in 7 above, wherein the valve-acting metal, alloy or electrically conducting oxide is subjected to at least one treatment selected from carbidation, phosphation, boronation, nitridation and sulfidation.

9. The chip solid electrolyte capacitor as described in any of 2 to 8 above, wherein the sintered body has a chemically and/or electrically etched surface.

10. The chip solid electrolyte capacitor as described in any of 2 to 9 above, wherein the boundary between the anode part and the part exclusive of the anode part of the anode substrate is insulated by an insulating resin.

11. The chip solid electrolyte capacitor as described in any of 2 to 10 above, wherein the oxide dielectric layer mainly comprises at least one member selected from $Ta_2O_5$, $Al_2O_3$, $TiO_2$ and $Nb2O_5$.

12. The chip solid electrolyte capacitor as described in any of 2 to 11 above, wherein the semiconductor layer is at least one member selected from an organic semiconductor layer and an inorganic semiconductor layer.

13. The chip solid electrolyte capacitor as described in 12 above, wherein the organic semiconductor is at least one member selected from an organic semiconductor comprising benzopyrroline tetramer and chloranil, an organic semiconductor mainly comprising tetrathiotetracene, an organic semiconductor mainly comprising tetracyano-quinodimethane, and an organic semiconductor mainly comprising an electrically conducting polymer obtained by doping a dopant to a polymer containing a repeating unit represented by the following formula (1) or (2):

$$\left[\begin{array}{c} R^1 \quad R^2 \\ \diagup\!\!\!\diagdown \\ X \\ | \\ R^5 \end{array}\right] \quad (1)$$

$$\left[\begin{array}{c} R^1 \quad R^2 \\ \diagup\!\!\!\diagdown \\ \diagdown\!\!\!\diagup \\ R^3 \quad R^4 \end{array} \!\!-\!\! \begin{array}{c} X \\ | \\ R^5 \end{array}\right] \quad (2)$$

wherein $R^1$ to $R^4$ each independently represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom, and represents a hydrogen atom or an alkyl group having from 1 to 6 carbon atoms, and each of the pairs of $R^1$ and $R^2$, and $R^3$ and $R^4$ may combine with each other to form a cyclic structure.

14. The chip solid electrolyte capacitor as described in 13 above, wherein the electrically conducting polymer containing a repeating unit represented by formula (1) is an electrically conducting polymer containing a structure unit represented by the following formula (3) as a repeating unit:

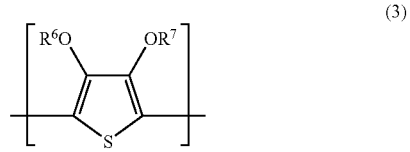

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen atoms when the alkyl groups are combined with each other at an arbitrary position, and the cyclic structure includes a structure having a vinylene bond which may be substituted, and a phenylene structure which may be substituted.

15. The chip solid electrolyte capacitor as described in 13 above, wherein the electrically conducting polymer is selected from polyaniline, polyoxyphenylene, polyphenylene sulfide, polythiophene, polyfuran, poly-pyrrole, polymethylpyrrole, and substitution derivatives and copolymers thereof.

16. The chip solid electrolyte capacitor as described in 15 above, wherein the electrically conducting polymer is poly (3,4-ethylenedioxythiophene).

17. The chip solid electrolyte capacitor as described in 12 above, wherein the inorganic semiconductor is at least one compound selected from molybdenum dioxide, tungsten dioxide, lead dioxide and manganese dioxide.

18. The chip solid electrolyte capacitor as described in any of 2 to 17 above, wherein the electrical conductivity of the semiconductor is from $10^{-2}$ to $10^3$ S/cm.

19. A method for producing a chip solid electrolyte capacitor, comprising placing and connecting a plurality of solid electrolyte capacitor elements horizontally in parallel with no gap on a pair of oppositely disposed end parts of a lead frame, stacking a fixing layer which is extending across the plurality of capacitor elements and fixing the capacitor elements with each other, and molding the capacitor elements with a resin while leaving outside the external terminal parts of the lead frame, the solid electrolyte capacitor being produced by stacking an oxide dielectric film layer, a semiconductor layer and an electrically conducting layer in this order to form a cathode part on a surface of an anode substrate exclusive of the anode part at one end comprising a sintered body of a valve-acting metal or an electrically conducting oxide or comprising the sintered body connected with a metal wire.

20. An electronic circuit using the chip solid electrolyte capacitor described in any one of 1 to 18 above.

21. An electronic device using the chip solid electrolyte capacitor described in any one of 1 to 18 above.

One embodiment of the chip solid electrolyte capacitor of the present invention is described by referring to the drawings.

FIG. 1 is a perspective view showing one example of a chip solid electrolyte capacitor using three solid electrolyte capacitor elements. In this example, the chip solid electrolyte capacitor has a structure that the cathode parts of three solid electrolyte capacitor elements (2) each produced by stacking an oxide dielectric film layer, a semiconductor layer and an electrically conducting layer in this order to form a cathode part (3) on a surface of an anode substrate (4) comprising a valve-acting metal or an electrically conducting oxide and being connected with an anode part lead (4a) are partially laid in parallel with no gap on one end part (1*a*) of a pair of oppositely disposed end parts of a lead frame (1), the anode part leads (4*a*) are laid on the other end part (1*b*), a fixing layer (6) extending across those three capacitor elements is further stacked before or after electrically and mechanically connecting respective parts, the entirety is molded with a resin while leaving outside the external terminal parts of the lead frame (1), and the lead frame is cut and bent at predetermined portions (not shown) outside the resin molding.

Figure 2:
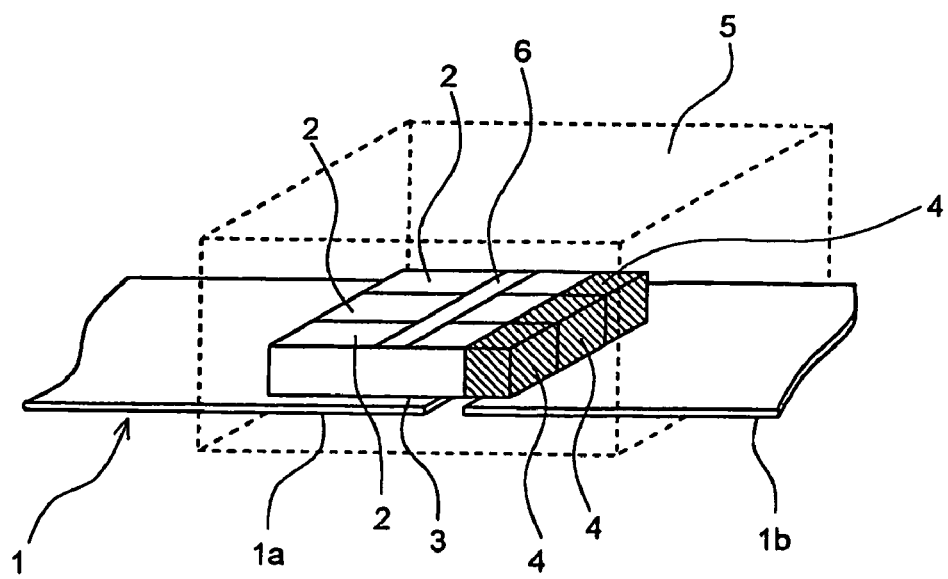
FIG. 2 is a perspective view of a chip solid electrolyte capacitor, showing the state where three solid electrolyte capacitor elements each having an anode part in the sintered body itself are placed horizontally in parallel with no gap on end parts of a lead frame.
Figure 3:
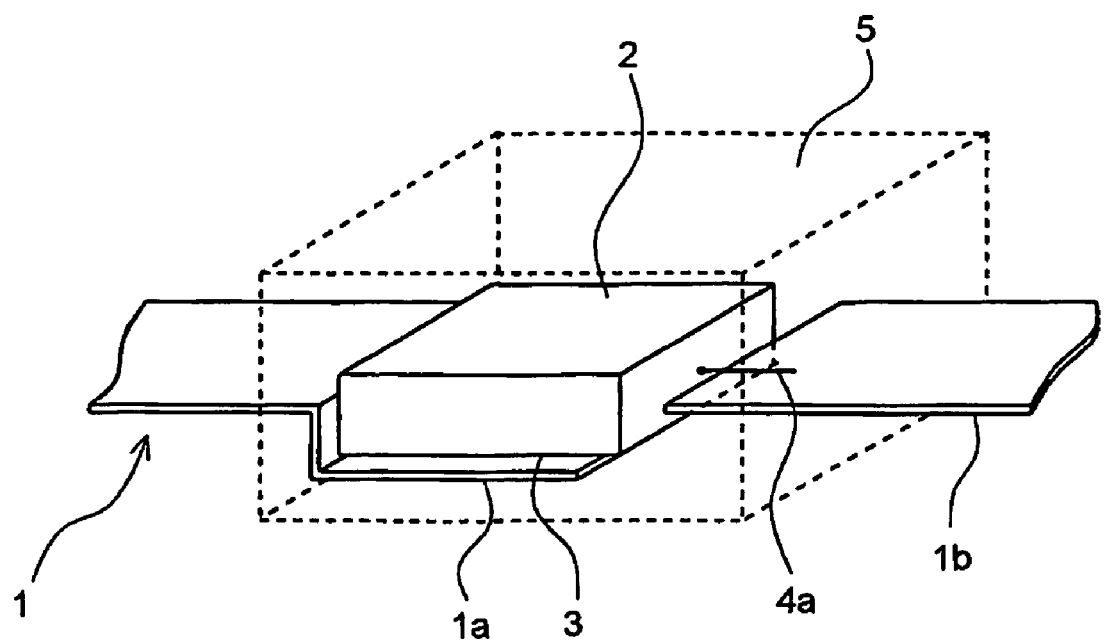
FIG. 3 is a perspective view showing a conventional chip solid electrolyte capacitor, where a solid electrolyte capacitor element is placed on end parts of a lead frame.

The fixing layer (6) is sufficient if it extends across the three capacitor elements, and this layer may extend across almost the entire face of each element as in the embodiment of FIG. 1 or may extend across a part of each element as in FIG. 2 which is a perspective view showing another example of the chip solid electrolyte capacitor of the present invention. The fixing layer preferably extends across almost the entire face.

The chip solid electrolyte capacitor of FIG. 2 has a structure that the cathode parts (3) of three solid electrolyte capacitor elements (2) each produced by stacking an oxide dielectric film layer, a semiconductor layer and an electrically conducting layer in this order on a surface of an anode substrate comprising a valve-acting metal or an electrically conducting oxide to form a cathode part (3) while allowing an anode part (4) to remain at an end part of the solid electrolytic capacitor element are gaplessly laid in parallel on one end part (1*a*) of a pair of oppositely disposed end parts of a lead frame (1), the anode parts (4) are laid on the other end part (1*b*), a fixing layer (6) extending across those three capacitor elements is further stacked before or after electrically and mechanically connecting respective parts, the entirety is molded with a resin while leaving outside the external terminal parts of the lead frame (1), and, similarly to the example of FIG. 1, the lead frame is cut and bent at predetermined portions outside the resin molding.

Examples of the valve-acting metal or electrically conducting oxide for use in the present invention include tantalum, aluminum, niobium, titanium, an alloy mainly comprising such a valve-acting metal or niobium oxide, and a mixture of two or more members selected from these valve-acting metals, alloys and electrically conducting oxides. The valve-acting metal, alloy, electrically conducting compound or the like may be partially subjected to at least one treatment selected from carbidation, phosphation, boronation, nitridation and sulfidation before use.

The anode substrate for use in the present invention is a sintered body obtained by shaping the powder of valve-acting metal or electrically conducting oxide and then sintering it. The surface area of the sintered body can be varied by appropriately selecting the shaping pressure and sintering conditions (temperature and time). After the sintering, the sintered body surface may be chemically and/or electrically etched to increase the surface area of the sintered body.

In the present invention, a part of the anode substrate (4) is used as the anode part. As shown in FIG. 2, a distal end of the anode substrate may be assigned to the anode part or as shown in FIG. 1, a metal wire (4*a*) may be connected to a part of the anode substrate and used as the anode part. Instead of a metal wire, a metal foil may also be used. The metal wire (or metal foil) may be connected after the sintered body is produced, or a part of the metal wire (or metal foil) may be embedded at the molding before the production of sintered body and then sintered, thereby taking the connection. Examples of the kind of the metal wire (or metal foil) include tantalum, niobium, aluminum, titanium, alloys mainly comprising such a metal, and these metals and alloys which are partially oxidized and/or nitrided. The diameter of the metal wire is usually 1 mm or less and in the case of a metal foil, the thickness is usually 1 mm or less. For the purpose of preventing the semiconductor layer described later from attaching to the portion serving as the anode part and short-circuiting the capacitor, the anode part and the remaining part of the anode substrate may be insulated by attaching an insulating resin like a hair band to the boundary therebetween.

Examples of the oxide dielectric film layer which is formed on the entirety or a part of the anode substrate surface excluding the anode part in the present invention include a dielectric layer mainly comprising at least one member selected from metal oxides such as $Ta_2O_5$, $Al_2O_3$, $TiO_2$ and $Nb_2O_5$. The dielectric layer can be formed by electrochemically forming the anode substrate in an electrolytic solution. Also, as described in WO00/75943 filed by the present applicant, a dielectric layer obtained by mixing a dielectric layer mainly comprising at least one member selected from metal oxides and a dielectric layer for use in ceramic capacitors may be used.

Representative examples of the semiconductor layer which is formed on the dielectric layer in the present invention include at least one compound selected from organic semiconductors and inorganic semiconductors.

Specific examples of the organic semiconductor include an organic semiconductor comprising benzopyrroline tetramer and chloranil, an organic semiconductor mainly comprising tetrathiotetracene, an organic semiconductor mainly comprising tetracyanoquinodimethane, and an organic semiconductor mainly comprising an electrically conducting polymer obtained by doping a dopant to a polymer containing a repeating unit represented by the following formula (1) or (2):

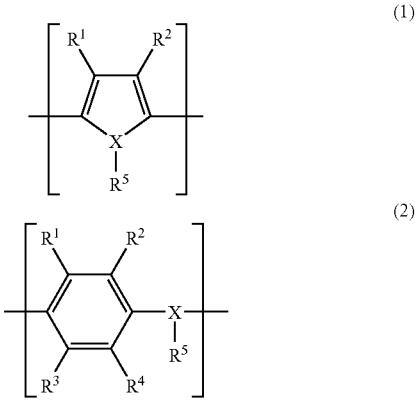

wherein $R^1$ to $R^4$ each independently represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom, and represents a hydrogen atom or an alkyl group having from 1 to 6 carbon atoms, and each of the pairs of $R^1$ and $R^2$, and $R^3$ and $R^4$ may combine with each other to form a cyclic structure.

Preferred examples of the electrically conducting polymer containing a repeating unit represented by formula (1) include an electrically conducting polymer containing a structure unit represented by the following formula (3) as a repeating unit:

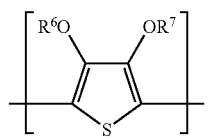
(3)

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen atoms when the alkyl groups are combined with each other at an arbitrary position, and the cyclic structure includes a structure having a vinylene bond which may be substituted, and a phenylene structure which may be substituted.

The electrically conducting polymer containing such a chemical structure is electrically charged and a dopant is doped thereto. For the dopant, known dopants can be used without limitation.

Examples of the polymer containing a repeating unit represented by formula (1), (2) or (3) include polyaniline, polyoxyphenylene, polyphenylene sulfide, polythiophene, polyfuran, polypyrrole, polymethylpyrrole, and substitution derivatives and copolymers thereof. Among these, preferred are polypyrrole, polythiophene and substitution derivatives thereof (e.g., poly(3,4-ethylenedioxythiophene)).

Specific examples of the inorganic semiconductors include at least one compound selected from molybdenum dioxide, tungsten dioxide, lead dioxide and manganese dioxide, etc.

When the organic or inorganic semiconductor used has an electrical conductivity of $10^{-2}$ to $10^3$ S/cm, the capacitor produced can have a small ESR value and this is preferred.

As for the method of forming the semiconductor layer, conventionally known methods such as a method using electrolytic polymerization (see, JP-A-60-37114), method using electrolytic polymerization of an anode substrate treated with an oxidizing agent (see, Japanese Patent No. 2,054,506), and method using chemical deposition (see, Japanese Patent No. 2,044,334) may be employed.

In the present invention, an electrically conducting layer is provided on the semiconductor layer formed by the above-described method or the like. The electrically conducting layer can be formed, for example, by the solidification of electrically conducting paste, plating, vapor deposition of metal, or adhesion of heat-resistant electrically conducting resin film. Preferred examples of the electrically conducting paste include silver paste, copper paste, aluminum paste, carbon paste and nickel paste, and these may be used individually or in combination of two or more thereof. In the case of using two or more pastes, the pastes may be mixed or may be superposed one on another as separate layers. The electrically conducting paste applied is then solidified by allowing it to stand in air or under heating.

The electrically conducting paste mainly comprises resin and electrically conducting powder such as metal. Depending on the case, a solvent for dissolving the resin or a hardening agent for the resin is added, and the solvent dissipates at the time of solidification. As for the resin, various known resins are used, such as alkyd resin, acrylic resin, epoxy resin, phenol resin, imide resin, fluororesin, ester resin, imidamide resin, amide resin and styrene resin. As for the electrically conducting powder, powder of silver, copper, aluminum, gold, carbon, nickel, an alloy mainly comprising such a metal or a mixture of these powder is used. The content of the electrically conducting powder is usually from 40 to 97 mass %. If the content is less than 40 mass %, the electrically conducting paste is small in the electrical conductivity, whereas if it exceeds 97 mass %, the electrically conducting paste disadvantageously causes adhesion failure. The electrically conducting paste may be used after mixing thereto powder of the above-described electrically conducting polymer or metal oxide for forming the semiconductor layer.

Examples of the plating include nickel plating, copper plating, silver plating and aluminum plating. Examples of the metal vapor-deposited include aluminum, nickel, copper and silver.

Specifically, for example, an electrically conducting layer is formed by stacking carbon paste and silver paste in this order on the anode substrate having formed thereon the semiconductor layer.

In this way, a solid electrolyte capacitor element where a cathode part is formed by stacking layers up to the electrically conducting layer on the anode substrate is produced.

In the production of the chip solid electrolyte capacitor of the present invention, a plurality of the thus-produced solid electrolyte capacitor elements are prepared, the cathode parts of respective solid electrolyte capacitor elements are partially laid in parallel with no gap on one end part of a separately prepared lead frame having a pair of oppositely disposed end parts, the anode parts of anode substrates are laid on the other end part, respective parts are electrically and mechanically connected, for example, by solidification of an electrically conducting paste for the former and by spot-welding for the latter, the entirety is molded with a resin while leaving outside a part of each end part of the lead frame, and the lead frame is cut and bent at predetermined portions outside the resin molding.

In the present invention, it is important that after a plurality of capacitor elements are placed on predetermined portions of a lead frame and electrically and mechanically connected to the lead frame or before connecting these elements, a fixing layer extending across the capacitor elements is further stacked on at least a part of the plurality of capacitor elements. In the scope of the present invention, there is also included an embodiment where the cathode parts of a plurality of capacitor elements are in advance partially connected by using an electrically conducting paste while laying these parts in parallel and aligning the direction before placing a plurality of capacitor elements on predetermined portions of a lead frame, a fixing layer extending across the elements is further stacked on at least a part of respective faces of the plurality of capacitor elements opposing the faces which are afterward laid on a lead frame, and/or a part of respective faces opposing the anode parts, the elements are then, as described above, placed on predetermined portions of a lead frame, to thereby connect the anode and cathode.

The fixing layer is preferably provided to cover the boundary portions of a plurality of capacitor elements. By covering the boundary portion between respective capacitor elements, for example, the stress acting to separate the capacitor elements from each other generated due to the resin flowed in at the molding can be decreased. As the fixing layer, a resin layer is used, and an electrically conducting layer is preferably used. As for the resin, various known resins are used, such as alkyd resin, acrylic resin, epoxy resin, phenol resin, imide resin, fluororesin, ester resin, imidamide resin, amide resin and styrene resin. The resin preferably undergoes less shrinkage at curing and a resin dissolved in a solvent may be used and cured by drying. The electrically conducting layer can be formed, for example, by the solidification of electrically conducting paste, plating, vapor deposition of metal, or adhesion of heat-resistant electrically conducting resin film. As for the electrically conducting paste, the electrically conducting pastes described above can be used. On the resin or electrically conducting paste stacked as the fixing layer, at least one material selected from metal foil, polymer film and ceramic sheet may be placed to reinforce the fixing layer. The thickness of the fixing layer (in the case of using a reinforcing material, the thickness including the reinforcing material) is determined by taking account of the standard thickness of the produced chip solid electrolyte capacitor. When a fixing layer is formed by using an electrically conducting material such as electrically conducting paste, the ESR value of the produced chip solid electrolyte capacitor decreases in some degree and thus, a certain improvement can be confirmed.

Specifically, as shown in FIG. 1, for example, three solid electrolyte capacitor elements are gaplessly laid in parallel on a pair of oppositely disposed end parts of a lead frame and after providing a fixing layer (6) extending across the elements, molded to produce one chip solid electrolyte capacitor having an angular shape, usually a rectangular parallelopiped shape. At the production of such a solid electrolyte capacitor, a notched part may be provided on a part of the side face and/or the bottom face to form a site for housing the lead frame after cutting, a notched part may be provided, for example, on the top face so as to distinguish the anode and the cathode, or the top face and/or the bottom face may be tapered at a certain angle to facilitate the release of the produced chip solid electrolyte capacitor from the die at the molding with resin.

The lead frame is cut as described above and finally works out to external terminals of the chip solid electrolyte capacitor. The shape thereof is a foil or tabular form and the construction material is iron, copper, aluminum or an alloy mainly comprising such a metal. The lead frame may be partially or entirely plated with solder, tin, titanium, silver, gold or the like. Between the lead frame and the plating, primer plating such as nickel or copper may be provided. The lead frame is disposed such that the two sides of the frames face each other with a gap, and by virtue of the presence of a gap, the anode part and the cathode part of each solid electrolyte capacitor element are insulated from each other.

As for the kind of the resin used in molding the chip solid electrolyte capacitor of the present invention, known resins for use in molding a chip solid electrolyte capacitor, such as epoxy resin, phenol resin, alkyd resin and aryl ester resin, are included. The production machine for performing the molding with resin is preferably a transfer machine.

The thus-produced solid electrolyte capacitor may be subjected to an aging treatment so as to repair the thermal and/or physical deterioration of the dielectric layer, which is caused at the formation of electrically conducting layer or at the jacketing.

The aging is performed by applying a predetermined voltage (usually, within 2 times the rated voltage) to the solid electrolyte capacitor. The optimal values of aging time and temperature vary depending on the kind and capacitance of capacitor and the rated voltage and therefore, are determined by previously performing an experiment, but the aging time is usually from several minutes to several days and the aging temperature is usually 300° C. or less by taking account of heat deterioration of the voltage-applying jig. The aging may be performed in the air or a gas atmosphere such as argon, nitrogen or helium and may be performed under reduced pressure, atmospheric pressure or applied pressure, but when the aging is performed while supplying water vapor or after vapor is supplied, the stabilization of the dielectric layer sometimes proceeds. Examples of the method for supplying the water vapor include a method of supplying water vapor from a water reservoir placed in the aging furnace by using the heat.

The chip solid electrolyte capacitor of the present invention can be preferably used for circuits using a high-capacitance capacitor, such as voltage stabilizing circuit and noise removing circuit. These circuits can be used in various digital devices such as a personal computer, server, camera, game machine, DVD equipment, AV equipment and cellular phone, and electronic devices such as various power sources. The chip solid electrolyte capacitor produced in the present invention is low in the initial LC and therefore, by using this chip solid electrolyte capacitor, electronic circuits and electronic devices having low energy consumption and in turn, small environmental load can be obtained.

EFFECTS OF THE INVENTION

The present invention provides a chip solid electrolyte capacitor where a fixing layer is formed to extend across capacitor elements placed horizontally in parallel with no gap on a lead frame, and according to the present invention, a chip solid electrolyte capacitor with low ESR and good LC value can be obtained.

BEST MODE FOR CARRYING OUT THE INVENTION

The present invention is described in greater detail by referring to Examples, however, the present invention is not limited to these Examples.

EXAMPLES 1 AND 2 AND COMPARATIVE EXAMPLE 1

By using tantalum powder having CV (product of capacitance and electrochemical voltage) of 150,000 μF·V/g, sintered bodies in a size of 4.5×0.95×1.5 mm were produced (sintering temperature: 1,300° C., sintering time: 20 minutes, density of the sintered body: 6.2 g/cm$^3$, Ta lead wire: 0.24 mmφ; a part of Ta lead wire was embedded in the sintered body to run in parallel to the longitudinal direction of the 4.5 mm dimension and the lead wire part protruded from the sintered body was used as the anode part). The sintered body to serve as the anode excluding a part of the lead wire was dipped in an aqueous 1% phosphoric acid solution and electrochemically formed at 80° C. for 8 hours by applying a voltage of 9 V between the anode and a Ta plate electrode as the cathode to form an oxide dielectric film layer composed of $Ta_2O_5$. Then, an operation of dipping this sintered body excluding the lead wire in a 1:1 mixed solution of an aqueous 20% lead acetate solution and an aqueous 35% ammonium persulfate solution, allowing it to stand at 40° C. for 1 hour, then pulling out, water-washing and drying the sintered body, and washing it with an aqueous 15% ammonium acetate solution was repeated 39 times to form a semiconductor layer composed of a lead dioxide and lead acetate mixture (lead dioxide: 96%) on the oxide dielectric film layer. On the semiconductor layer, carbon paste and silver paste comprising 10 mass parts of epoxy resin and 90 mass parts of silver powder were sequentially stacked to complete the cathode part, thereby producing a solid electrolyte capacitor element.

On a pair of end parts of a separately prepared 100 μm-thick copper alloy lead frame having a tin-plated surface (32 paired end parts each in a width of 3.4 mm were present; the end part on which the cathode part was laid had a step of 0.8 mm as shown in FIG. 1 and the portion where the cathode part was laid had a length of 4.6 mm; and when coplanarly projected, a gap of 1 mm was present between both end parts), three solid electrolyte capacitor elements produced above were connected horizontally in parallel with no gap (the cathode side of the solid electrolyte capacitor element, namely, the 4.5×0.95 face of the sintered body was laid on the end part having a step and the anode side of the solid electrolyte capacitor element was laid on the other end part; each was electrically and mechanically connected by solidification of the same silver paste used to form the cathode part for the former and by spot-welding for the latter). Subsequently, as shown in FIG. 1, a fixing layer was provided by using the above-described silver paste on a part of respective connection faces of three capacitor elements in the cathode side opposing the face placed on the lead frame. The fixing layer was provided to cover about 70% of the face of each capacitor element opposing the face in the lead frame side to a maximum thickness of 0.15 mm (Example 1) or to cover 90% to a thickness of 0.35 mm (Example 2) (each values is an average of 10 units by random inspection). Also, a sample where a fixing layer was not provided was produced (Comparative Example 1). In each Example, three solid electrolyte capacitor elements were connected on each pair of end parts on one lead frame and 96 solid electrolyte capacitor elements were connected in total. Thereafter, a part of both end parts of the lead frame and the solid electrolyte capacitor elements were molded with epoxy resin by transfer molding to produce a chip solid electrolyte capacitor in a size of 7.3×4.3×2.8 mm. After molding, both end parts outside the resin molding was each cut at the position of 3.4 mm from the end face of the resin mold, the frame cut out was removed and the end parts connected to the chip solid electrolyte capacitor and remaining outside each was bent along the outer circumference of the capacitor and used as the external terminal. From one lead frame, 32 chip solid electrolyte capacitors were produced.

EXAMPLE 3

Chip solid electrolyte capacitors were produced in the same manner as in Example 1 except that the electrically conducting paste used for the fixing layer in Example 1 was replaced by an acrylic resin alone not containing silver powder. The fixing layer covered about 70% of the face of each capacitor element opposing the face in the lead frame side to a maximum thickness of 0.17 mm.

EXAMPLE 4 AND COMPARATIVE EXAMPLE 2

After the procedure until the formation of a dielectric layer was performed in the same manner as in Example 1, an operation of dipping the sintered body alternately in a 3% 3,4-ethylenedioxythiophene alcohol solution and in an aqueous 13% anthraquinone-2-sulfonic acid solution having dissolved therein 1.5% ammonium persulfate was repeated seven times to attach multiple fine contacts mainly comprising ethylenedioxy polymer on the dielectric layer, thereby producing a plurality of fine electrical defective portions in the dielectric layer. According to the observation by a scanning electron microscope (SEM), dot-like fine contacts covered about 8% of the dielectric layer. Subsequently, the sintered body was dipped in an electrolytic solution of water and 20% ethylene glycol, where ethylenedioxythiophene (used in the form of an aqueous solution having a monomer concentration lower than the saturated concentration) and anthraquinonesulfonic acid were dissolved, and for forming a semiconductor layer, a direct current voltage of 12 V was passed between the anode assigned to the lead wire of the sintered body and a tantalum electrode as the negative electrode disposed in the electrolytic solution, at room temperature for 45 minutes. The sintered body was then pulled up, washed, dried and subjected to re-electrochemical formation (80° C., 30 minutes, 7 V) in an aqueous 0.1% acetic acid solution to repair the fine LC-causing defects of the dielectric layer. After repeating ten times the operation of passing the direct current voltage and performing the re-electrochemical formation, the sintered body was washed with water and dried to form a semiconductor layer working as the cathode. On the semiconductor layer, carbon paste and silver paste (comprising 10 mass parts of acrylic resin and 90 mass parts of silver powder; the solvent for dissolving the acrylic resin was present at the beginning but dissipated at the solidification by drying) were sequentially stacked to complete the cathode layer, thereby producing a solid electrolyte capacitor element.

Thereafter, solid electrolytic capacitor elements were placed on a lead frame in the same manner as in Example 1 and a fixing layer extending across the elements was provided by using silver paste comprising 10 mass parts of acrylic resin and 90 mass parts of silver paste. From samples where the fixing layer was provided to cover about 70% of the face of each capacitor element opposing the face in the lead frame side to a maximum thickness of 0.25 mm (Example 4) or where the fixing layer was not provided (Comparative Example 2), chip solid electrolyte capacitors were produced in the same manner as in Example 1.

EXAMPLE 5 AND COMPARATIVE EXAMPLE 3

By using 0.023 g of partially nitrided niobium powder (nitrogen amount: 12,000 ppm, total oxygen amount: 98,000 ppm resulting from natural oxidation of the surface) having CV of 190,000 μF·V/g, many sintered bodies in a size of 4.5×0.94×1.5 mm were produced (sintering temperature: 1,280° C., sintering time: 30 minutes, density of sintered body: 3.6 g/cm$^3$, Nb lead wire: 0.29 mmφ). The sintered body excluding a part of the lead wire was dipped in an aqueous 0.1% phosphoric acid solution and electrochemically formed at 80° C. for 5 hours by applying a voltage of 20 V between the sintered body and a Ta plate electrode as the negative electrode to form a dielectric layer mainly comprising $Nb_2O_5$. Then, an operation of dipping this sintered body alternately in a 3% ethylenedioxythiophene alcohol solution and in an aqueous 13% anthraquinonesulfonic acid solution having dissolved therein 1.5% ammonium persulfate was repeated seven times to attach multiple fine adhering particles mainly comprising an ethylenedioxy polymer on the dielectric layer, thereby producing a plurality of fine electrical defective portions in the dielectric layer. According to the observation by a scanning electron microscope (SEM), dot-like fine adhering particles covered about 11% of the dielectric layer. Subsequently, the sintered body was dipped in the same electrolytic solution as in Example 4 and for forming a semiconductor layer, a direct current of 30 μA was passed between the anode assigned to the lead wire of the sintered body and a tantalum electrode disposed in the electrolytic solution used as the cathode, at room temperature for 45 minutes. The sintered body was then pulled up, washed, dried and subjected to re-electrochemical formation (80° C., 30 minutes, 14 V) in an aqueous 0.1% acetic acid solution to repair the fine LC-causing defects of the dielectric layer. After repeating ten times the operation of passing the direct current and performing the re-electrochemical formation, the sintered body was washed with water and dried to form a semiconductor layer working as the cathode. On the semiconductor layer, carbon paste and silver paste comprising 10 mass parts of acrylic resin and 90 mass parts of silver powder were sequentially stacked to complete the cathode layer, thereby producing a solid electrolyte capacitor element. Thereafter, from samples where a fixing layer was provided to cover about 70% of the face of each capacitor element opposing the face in the lead frame side to a maximum thickness of 0.28 mm (Example 5) or where a fixing layer was not provided (Comparative Example 3), chip solid electrolyte capacitors were produced in the same manner as in Example 4.

With respect to 150 units for each of the chip solid electrolyte capacitors produced in Examples 1 to 5 and Comparative Examples 1 to 3, the capacitor capacitance, ESR value and LC value were measured according to the following methods and the results (average value) obtained are shown in Table 1.

Capacitance of a Capacitor:

The capacitance was measured at room temperature and 120 Hz by using an LCR measuring meter manufactured by Hewlett Packard.

ESR Value:

The equivalent series resistance of a capacitor was measured at 100 kHz.

LC Value:

After continuously applying a predetermined direct current voltage (2.5 V for Examples 1 to 4 and Comparative Examples 1 and 2, and 4 V for Example 5 and Comparative Example 3) between terminals of the produced capacitor for 30 seconds at room temperature, the LC value was measured.

TABLE 1

|  | Capacitance (μF) | ESR (mΩ) | LC (μA) |
| --- | --- | --- | --- |
| Examples |  |  |  |
| 1 | 1320 | 4 | 31 |
| 2 | 1320 | 4 | 30 |
| 3 | 1320 | 6 | 28 |
| 4 | 1340 | 4 | 36 |
| 5 | 480 | 10 | 28 |
| Comparative Examples |  |  |  |
| 1 | 1320 | 4 | 54 |
| 2 | 1320 | 4 | 60 |
| 3 | 480 | 11 | 47 |

As seen from comparison of Examples 1 to 4 with Comparative Examples 1 and 2 and comparison of Example 5 with Comparative Example 3, a good LC value can be obtained by forming a fixing layer extending across the capacitor elements.

The invention claimed is:

1. A resin-molded chip solid electrolyte capacitor comprising a plurality of solid electrolyte capacitor elements horizontally laid in parallel with no gap on a pair of oppositely disposed end parts of a lead frame, and a fixing layer extending horizontally across the plurality of capacitor elements and fixing the capacitor elements with each other.

2. The chip solid electrolyte capacitor as claimed in claim 1, wherein the solid electrolyte capacitor element is produced by stacking an oxide dielectric film layer, a semiconductor layer and an electrically conducting layer in this order to form a cathode part on a surface exclusive of the anode part at one end of an anode substrate comprising a sintered body of a valve-acting metal or an electrically conducting oxide or comprising the sintered body connected with a metal wire, and the anode part and the cathode part each is laid to come into contact with the end part of the lead frame.

3. The chip solid electrolyte capacitor as claimed in claim 2, wherein the anode part comprises a distal end of the anode substrate.

4. The chip solid electrolyte capacitor as claimed in claim 2, wherein the anode part comprises a metal wire or foil connected to the sintered body.

5. The chip solid electrolyte capacitor as claimed in claim 4, wherein the metal wire is selected from tantalum, niobium, aluminum, titanium, alloys mainly comprising such a metal, and these metals and alloys which are partially oxidized and/or nitrided.

6. The chip solid electrolyte capacitor as claimed in claim 2, wherein the valve-acting metal or electrically conducting oxide is tantalum, aluminum, niobium, titanium, an alloy mainly comprising such a valve-acting metal or niobium oxide, or a mixture of two or more members selected from these valve-acting metals, alloys and electrically conducting oxides.

7. The chip solid electrolyte capacitor as claimed in claim 6, wherein the valve-acting metal, alloy or electrically conducting oxide is subjected to at least one treatment selected from carbidation, phosphation, boronation, nitridation and sulfidation.

8. The chip solid electrolyte capacitor as claimed in claim 2, wherein the sintered body has a chemically and/or electrically etched surface.

9. The chip solid electrolyte capacitor as claimed in claim 2, wherein the boundary between the anode part and the part exclusive of the anode part of the anode substrate is insulated by an insulating resin.

10. The chip solid electrolyte capacitor as claimed in claim 2, wherein the oxide dielectric layer mainly comprises at least one member selected from $Ta_2O_5$, $Al_2O_3$, $TiO_2$ and $Nb_2O_5$.

11. The chip solid electrolyte capacitor as claimed in claim 2, wherein the semiconductor layer is at least one member selected from an organic semiconductor layer and an inorganic semiconductor layer.

12. The chip solid electrolyte capacitor as claimed in claim 11, wherein the organic semiconductor is at least one member selected from an organic semiconductor comprising benzopyrroline tetramer and chloranil, an organic semiconductor mainly comprising tetrathiotetracene, an organic semiconductor mainly comprising tetracyano-quinodimethane, and an organic semiconductor mainly comprising an electrically conducting polymer obtained by doping a dopant to a polymer containing a repeating unit represented by the following formula (1) or (2):

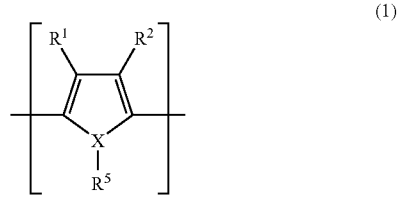

(1)

-continued

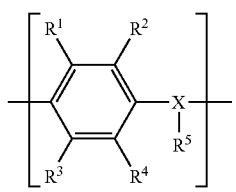
(2)

wherein $R^1$ to $R^4$ each independently represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom, and represents a hydrogen atom or an alkyl group having from 1 to 6 carbon atoms, and each of the pairs of $R^1$ and $R^2$, and $R^3$ and $R^4$ may combine with each other to form a cyclic structure.

13. The chip solid electrolyte capacitor as claimed in claim 12, wherein the electrically conducting polymer containing a repeating unit represented by formula (1) is an electrically conducting polymer containing a structure unit represented by the following formula (3) as a repeating unit:

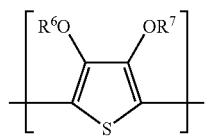
(3)

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen atoms when the alkyl groups are combined with each other at an arbitrary position, and the cyclic structure includes a structure having a vinylene bond which may be substituted, and a phenylene structure which may be substituted.

14. The chip solid electrolyte capacitor as claimed in claim 12, wherein the electrically conducting polymer is selected from polyaniline, polyoxyphenylene, polyphenylene sulfide, polythiophene, polyfuran, polypyrrole, polymethylpyrrole, and substitution derivatives and copolymers thereof.

15. The chip solid electrolyte capacitor as claimed in claim 14, wherein the electrically conducting polymer is poly(3,4-ethylenedioxythiophene).

16. The chip solid electrolyte capacitor as claimed in claim 11, wherein the inorganic semiconductor is at least one compound selected from molybdenum dioxide, tungsten dioxide, lead dioxide and manganese dioxide.

17. The chip solid electrolyte capacitor as claimed in claim 2, wherein the electrical conductivity of the semiconductor is from $10^{-2}$ to $10^3$ S/cm.

18. The chip solid electrolyte capacitor as claimed in claim 1, wherein the fixing layer is a resin layer or an electrically conducting layer.

19. An electronic circuit using the chip solid electrolyte capacitor described in claim 1.

20. An electronic device using the chip solid electrolyte capacitor described in claim 1.

21. A method for producing a chip solid electrolyte capacitor, comprising placing and connecting a plurality of solid electrolyte capacitor elements horizontally in parallel with no gap on a pair of oppositely disposed end parts of a lead frame, stacking a fixing layer which is extending across the plurality of capacitor elements and fixing the capacitor elements with each other, and molding the capacitor elements with a resin while leaving outside the external terminal parts of the lead frame, the solid electrolyte capacitor being produced by stacking an oxide dielectric film layer, a semiconductor layer and an electrically conducting layer in this order to form a cathode part on a surface of an anode substrate exclusive of the anode part at one end comprising a sintered body of a valve-acting metal or an electrically conducting oxide or comprising the sintered body connected with a metal wire.

* * * * *